UNITED STATES PATENT OFFICE.

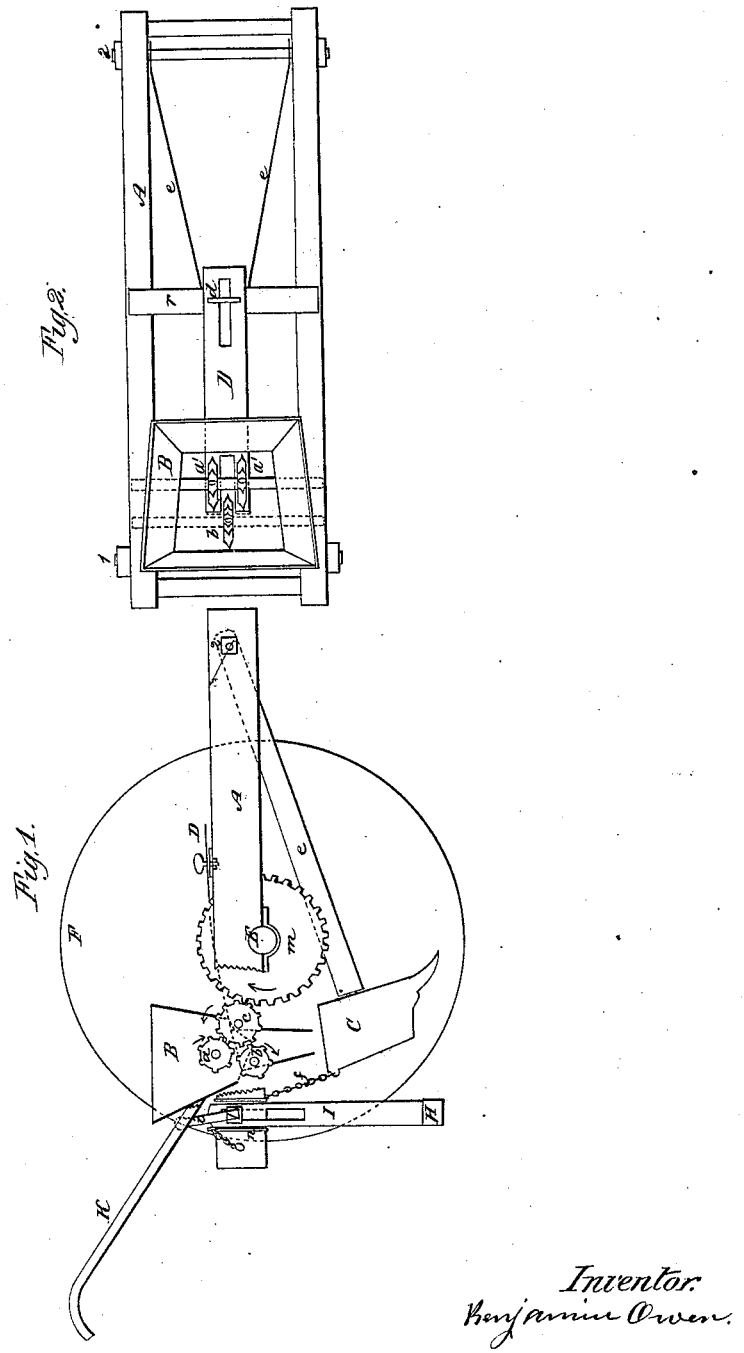

BENJAMIN OWEN, OF DAYTON, OHIO, ASSIGNOR TO HIMSELF AND JOHN OWEN, OF SAME PLACE.

IMPROVEMENT IN COTTON-SEED PLANTERS.

Specification forming part of Letters Patent No. 53,377, dated March 20, 1866; antedated February 28, 1866.

*To all whom it may concern:*

Be it known that I, BENJAMIN OWEN, of Dayton, in the county of Montgomery, in the State of Ohio, have invented a new and Improved Cotton-Seed Planter; and I do hereby declare that the following is a full and exact description thereof, reference being had to the accompanying drawings, and to the letters and numerals of reference marked thereon, like letters and numerals referring to like parts occurring on the different figures.

The nature of my invention consists in constructing an improved machine for planting cotton-seed.

To enable others skilled in the art to make and use my invention, I will proceed to describe its construction and operation.

Figure 1 represents a lateral view in perspective, a portion of the frame being cut away to show the gear, and only the rim of the driving-wheel is shown. Fig. 2 represents some of the parts as seen from above.

A represents the frame of the machine; F, the driving-wheel, which may be attached permanently to the shaft E, or by a well-known device thrown out or in gear when desirable. On the opposite end of the shaft is a wheel of like size, which moves freely on the shaft. These wheels support the machine.

C is a hollow score or plow, and is securely bolted to the drag-bar $e$. This drag-bar has two arms, which are securely held by the rod 2, which likewise holds the frame together.

To the plow is attached a chain, $f$, and this chain is hooked onto a pin on the frame, and is used to raise the plow when its use is not required.

$m$ is a cog-wheel attached to the shaft E, and gears into the cog-wheel $c$, which wheel turns on an axle attached to the frame, and this wheel gears into the wheels $a\ b$, which are supported by shafts the bearings of which are attached to the frame. To these shafts are attached three wheels, (shown at Fig. 2,) viz., $a'\ a'$ and $b'$. These wheels have long pikes or pins projecting from their peripheries, and are made to rotate in the same direction by the power communicated from the driving-wheel.

B is a hopper, into which the cotton-seed is placed for distribution. The two upper wheels, $a'\ a'$, agitate the seed, and consequently carry it down when it is brought in contact with the lower toothed wheel, by which the seed is carried through the bottom of the hopper into the tube, thence into the hollow of the plow, to the score or furrow in the soil.

There are two arms, I, having an opening for the bolt 1, by which bolt the arms are held and adjusted as to height. To the lower end of these arms is bolted a piece, H. This piece is concave on its under and front surfaces, and is used to drag the earth into the furrow to cover the seed.

The arms I move within the flanged piece $n$, and this piece has flanges over lapping the frame. The handles K are fastened to the frame, and have two braces, $i$, through the lower end of which the bolt passes. The bolt 1 holds the frame, the arm I, the piece $n$, and the stay $i$ securely.

To the frame is attached the plate $r$. This forms a support for one end of the regulating-slide D, and this slide, when adjusted, is stayed in position by the thumb-screw $d$. This slide passes through the side of the hopper and inclines considerably downward, and the end passes on both sides of the wheel $b'$, thus regulating the quantity of seed passing from the hopper. The slide rests on the bottom of the hopper, and the teeth of the wheels $a'\ a'$, the shaft of which passes through the sides of the hopper, work near the slide.

The wheel $b'$ works within an opening in the hopper, the teeth of which extend between the lateral surfaces of the wheels $a'\ a'$.

The hopper B is supported by the frame, and has a tube on the under side, through which the seed passes from the hopper to the space within the plow.

What I claim as my invention, and desire to secure by Letters Patent, is—

1. The arrangement of the cog-gear $a\ b\ c\ m$ with reference to the driving-wheel F and its shaft E, the frame A, and the toothed wheels $a'\ a'\ b'$, substantially as described, and for the purpose specified.

2. The piece $n$, arranged with reference to the frame A, bolt 1, arm I, and stay $i$, substantially as and for the purpose specified.

3. The toothed wheels $a'\ a'\ b'$, operating and arranged substantially as described with reference to the hopper B and the slide D.

4. The slide D, constructed and arranged with reference to the opening in the hopper B and to the wheel $b'$, substantially as described, and for the purpose specified.

BENJAMIN OWEN.

Witnesses:
THOS. D. MITCHELL,
JASPER BILLINGS.